United States Patent [19]

Snyder

[11] Patent Number: 5,160,100
[45] Date of Patent: Nov. 3, 1992

[54] AIRFOIL CANOPY AIRCRAFT

[76] Inventor: Stephen L. Snyder, 420 Pleasant Valley Ave., Moorestown, N.J. 08057

[21] Appl. No.: 724,191

[22] Filed: Jul. 1, 1991

[51] Int. Cl.$^5$ ................................................ B64C 3/38
[52] U.S. Cl. ........................................... 244/13; 244/2; 244/46; 244/902; 244/903; 244/904
[58] Field of Search ................. 244/2, 13, 16, 46, 47, 244/48, 49, 145, 902, 903, 904

[56] References Cited

U.S. PATENT DOCUMENTS

| | | | |
|---|---|---|---|
| 1,278,462 | 9/1918 | Harris | 244/903 |
| 3,140,842 | 7/1964 | Craigo et al. | 244/903 |
| 3,153,877 | 11/1962 | Effinger, Jr. et al. | |
| 3,204,368 | 10/1963 | Effinger, Jr. et al. | |
| 3,443,779 | 11/1967 | Rogallo et al. | |
| 3,700,191 | 10/1972 | Page | 244/16 |
| 3,744,180 | 7/1973 | Mabuchi | 244/903 |
| 3,920,201 | 11/1975 | Battles | 244/16 |
| 4,180,221 | 12/1979 | Harris | |
| 4,375,280 | 3/1983 | Nicolaides | 244/903 |
| 4,440,366 | 4/1984 | Keeler et al. | |
| 4,601,443 | 7/1986 | James et al. | 244/903 |
| 4,634,080 | 1/1987 | McNally | 244/13 |
| 4,657,207 | 4/1987 | Poling | 244/903 |
| 4,934,630 | 6/1990 | Snyder | |

Primary Examiner—Galen Barefoot
Attorney, Agent, or Firm—Jacobson, Price, Holman & Stern

[57] ABSTRACT

An aircraft comprises a vehicle (1) suspended in flight by a steering control rod (68) pivotally mounted to the body of the vehicle and having outer ends (12, 14) connected to the lower ends of load suspension lines (3, 5, 6) connected at their upper ends to a flexible wing portion (2) of a ram air inflatable type of airfoil canopy. Steering of the aircraft is by pivotal movement of control rod (68) to manipulate the load suspension lines and thereby the canopy surfaces. The aircraft may be radio controlled by a radio receiver (112) in the vehicle body for operating the speed of a drive motor (36) for driving a propeller (38) and a steering drive motor (98) coupled to the control rod (68) by a suitable linkage system. Battery pack (104) is removably mounted in the vehicle body for providing power to the receiver and motors therein. The radio controlled aircraft is controlled by a remote transmitter which controls the steering and speed of the aircraft.

21 Claims, 3 Drawing Sheets

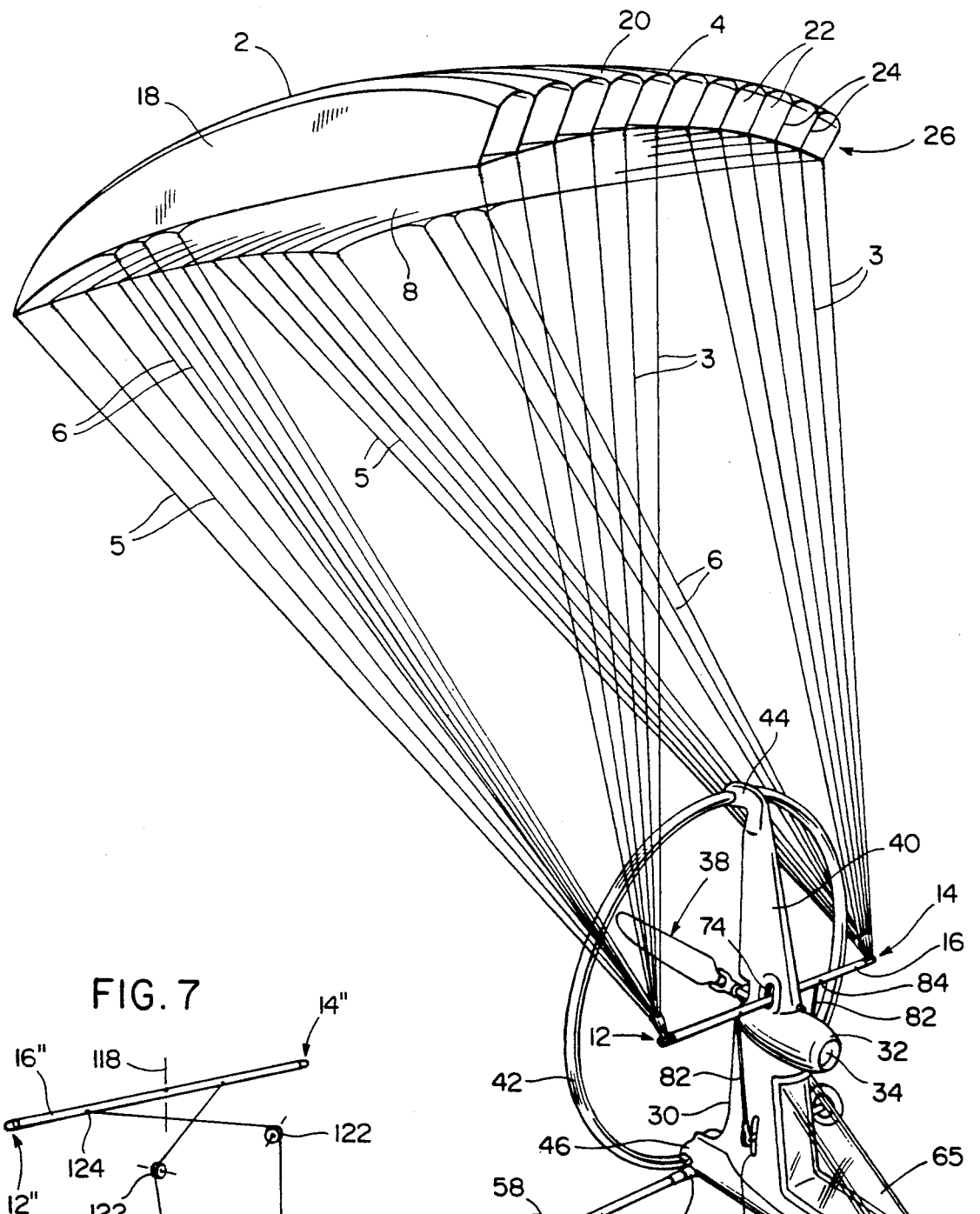
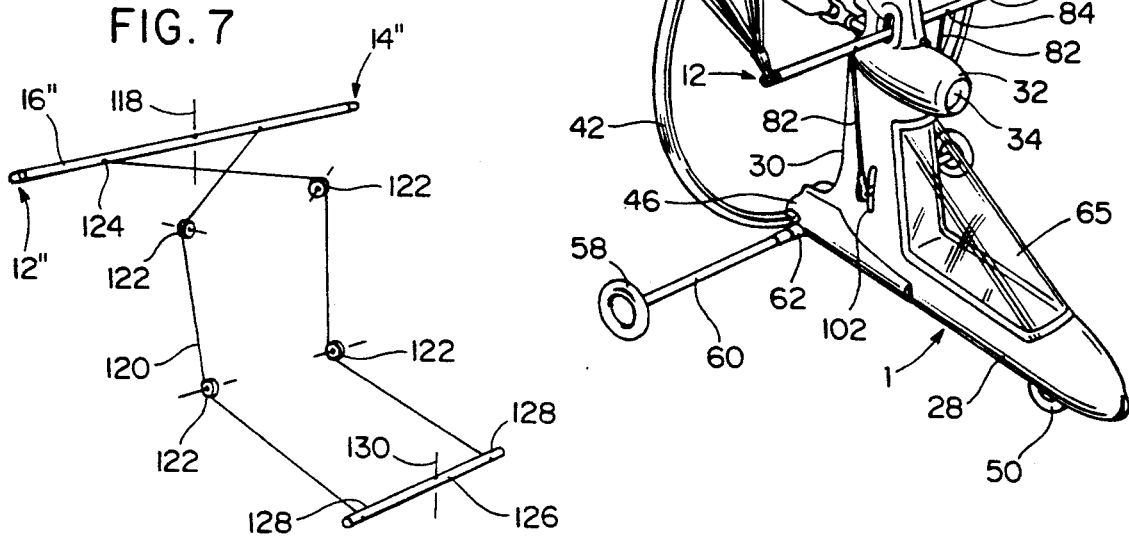

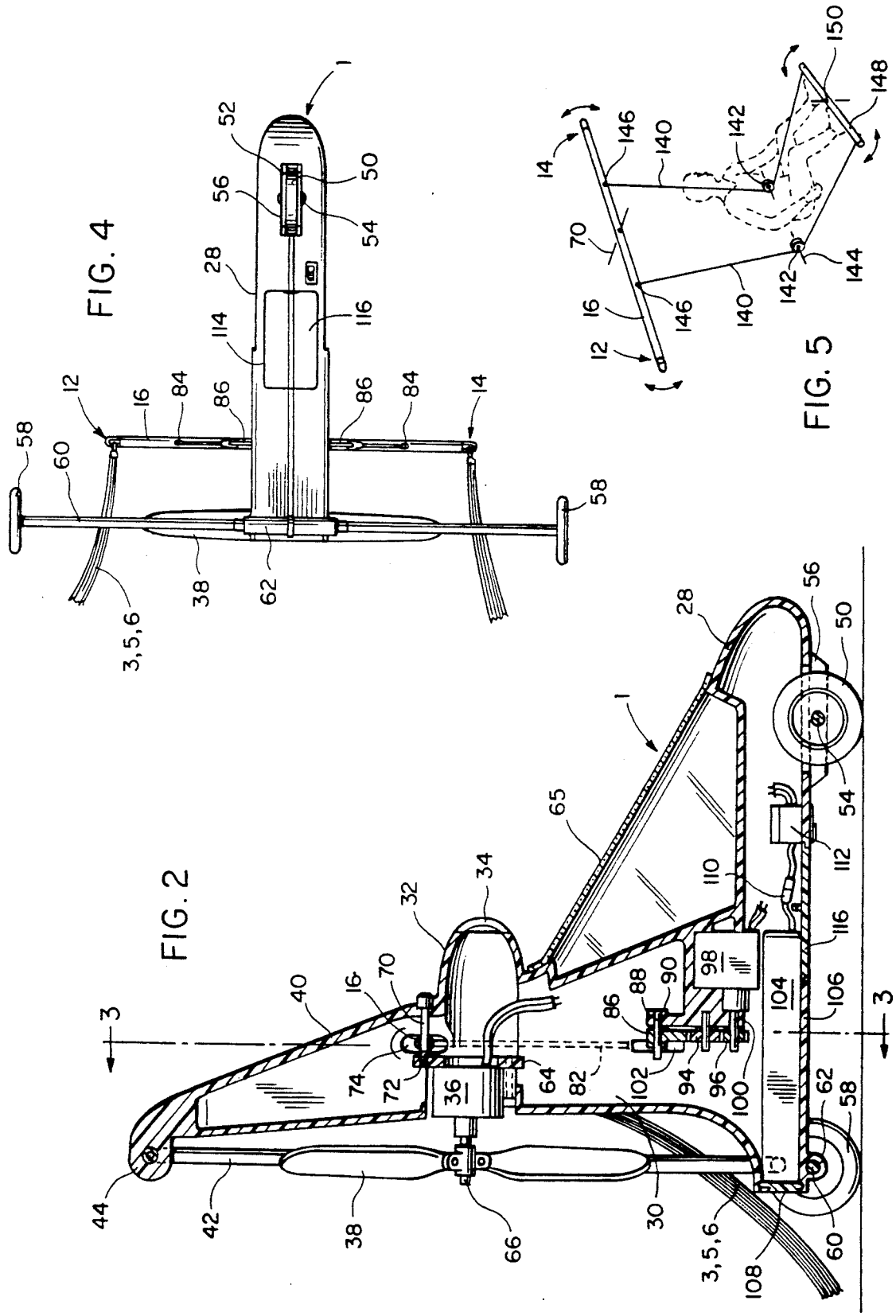

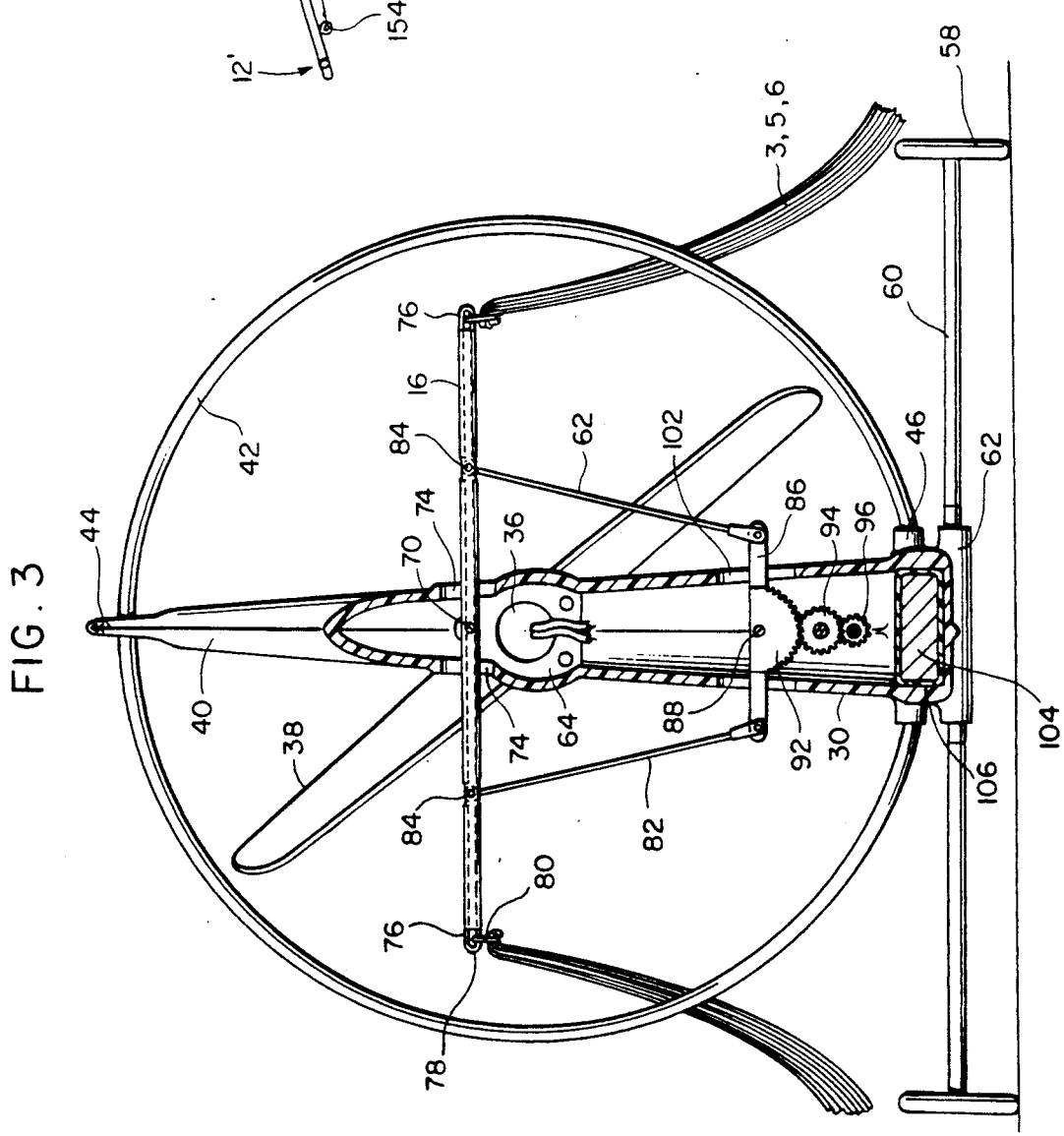

AIRFOIL CANOPY AIRCRAFT

BACKGROUND OF THE INVENTION

This invention relates generally to a class of lightweight aircraft which receives its lift from an inflatable canopy type of flexible airfoil wing. This aircraft invention may be a model aircraft of the remote radio controlled type, or may be a type of lightweight aircraft referred to as "ultralights". Model airplanes and ultralights known today for recreational and sporting purposes more commonly feature the use of relatively rigid wings as part of a glider type air frame mounting a lightweight powered propeller. Such aircraft although exceedingly light in weight are dimensionally extensive and bulky and therefore pose ground transportation problems as well as storaqe problems.

In comparison with the foregoing rigid wing type of aircraft, there is shown in applicant's previous U.S. Pat. No. 4,934,630, issued Jun. 19, 1990, a powered flight vehicle having a flexible airfoil canopy connected thereto by load suspension lines in the flight condition. This provides a substantially smaller aircraft that is collapsible to a compact condition for ground transport and storage. Such aircraft are also known, for example, in a published U.S Air Force Technical Report AFFDL-72-73, entitled "Parafoil Powered Flight Performance", by John D. Nicolaides, which, however, was found to have various control and handling problems, and until the aircraft shown in U.S. Pat. No. 4,934,630 was invented, the inflated airfoil canopy type of aircraft was not theretofore seriously considered as a marketable aircraft.

BRIEF SUMMARY OF THE INVENTION

It is an object of the present invention to provide a powered flight aircraft having a ram air inflatable, airfoil wing canopy, as a remote controlled aircraft, model aircraft, or an "ultralight", which is not subject to unsafe flight hazards such as stall and spin.

A further object of the invention is to provide a control system for an aircraft, model aircraft or "ultralight" that is controlled in a simple and easy manner by a control bar movably mounted on the vehicle and connected to the load suspension lines which are also connected to the wing canopy so that movement of the control bar relative to the vehicle manipulates the canopy to control the flight of the aircraft.

A still further object of the invention is to provide means for turning an aircraft without producing canopy distorting drag forces that is easy and simple to control so as to enable safe flight by relatively inexperienced persons since pitch and roll controls are not required.

Another object of the present invention is to provide an aircraft construction of the foregoing type having a wing that is collapsible and foldable into a most compact form.

A still further object of the invention is to provide an aircraft that is readily launched, or conditioned for take-off, and easy or simple to control during flight including directional steering, climb and descent.

In accordance with the present invention, a three wheel flight vehicle is associated with a ram air inflated type of rectangular airfoil canopy such as disclosed in my previous U.S. Pat. No. 3,724,789, having chordwise extending air cells. The air cells are separated by ribs and are open at a leading edge of the canopy formed by a spanwise intake face from which the canopy fabric on the top and bottom surfaces taper along airfoil curvature to the trailing edge. Load suspension lines extend from the leading edge and from the bottom surface at locations intermediate the leading and trailing edges to laterally spaced suspension points on a control and support bar movably mounted on the flight vehicle. The laterally spaced suspension points, or load line anchors, are positioned on the control rod to establish a geometrical relationship between the vehicle and inflated canopy through the load lines which produces an automatic change in attitude of the canopy. By controlling the magnitude of the forward thrust, climb and descent, of the aircraft may be regulated while maintaining a constant cruising speed. Forward thrust is imparted to the vehicle by a pusher propeller driven by an electric motor or an internal combustion engine in accordance with different embodiments of the invention. Thus, throttle control of the engine may be utilized to change the forward thrust imparted to the vehicle to regulate climb and descent, and to achieve and maintain level flight.

A three point ground wheel system may be used for supporting the vehicle on the ground during take-off and landing.

The change in canopy attitude previously referred to not only depends on forward thrust control, but also on the optimum location of the vehicle load for its center of gravity relative to the suspension points of attachment of the load lines to the control bar which is mounted on the vehicle for relative movement thereto 19 for controlling the chute by tension or manipulation of the load lines. In this invention the vehicle's center of gravity is always below the suspension points on the control bar.

In accordance with one embodiment of the invention, the suspension points are on the end portions of a control bar which is pivotally mounted on the vehicle for pivotal movement about a horizontal axis extending in the direction of flight, i.e. when the vehicle is in a substantially straight, forward moving horizontal flight position in which a central axis of the vehicle extending in the direction of flight coincides with the horizontal axis. The control rod may be pivoted about its pivotal axis by means of a suitable linkage driven by an electric servo motor which is radio controlled by a commercially available dual channel radio control system, such as that made by "HITEC" utilizing a "Challenger 25" motor, an HP-2RNB receiver, electric motor speed controller SP-18011 and Servo Control HS-300. Alternatively, the control bar may be manipulated by control wires, or lines, extending therefrom to a steering rod or bar pivotally mounted on the vehicle about a vertical, or approximately vertical axis extending transversely to the central axis or line of flight of the vehicle and pivoted by a gear drive transmission connected to an electric motor. A pulley and control line system may also be utilized and connected to the drive motor for carrying out the same control rod manipulating function.

The thrust for the aircraft may be provided by an electric motor mounted on the vehicle and connected to a drive propeller, preferably as a pusher type propeller driven aircraft. The electric drive motor, radio receiver and batteries for supplying power thereto, are supported on the vehicle so that the center of gravity of the vehicle is below the suspension points on the control rod. The battery may be a single unit or an assembly of rechargeable batteries insertable into a battery mounting well or chamber within the vehicle body, or carried externally, so that the batteries can be readily removed for replacement or recharging. Suitable electrical connection means are provided for connecting the battery assembly to the radio receiver and steering drive motor and propeller motor. With the above means, an operator on the ground by operating a dual channel transmitter, also powered by suitable electrical power means such as a battery, can control the steering drive motor for operating the control bar for steering the aircraft in flight and also the speed of the drive motor for the propeller.

Instead of the control rod being pivotable about a horizontal axis, it can also be pivotable about a vertical axis, i.e. vertical during level flight position, so that the outer end portions of the control rod on which the suspension points are located are moved in a horizontal, or substantially horizontal, plane clockwise and counterclockwise, or forwardly and rearwardly, with respect to the vehicle about the vertical pivot axis to exert control forces on the load lines and thereby control the lateral orientation of the chute relative to the longitudinal axis of the aircraft body for steering the aircraft.

An additional alternative steering system may be utilized wherein the control rod is movable substantially linearly in the direction of the longitudinal axis of the control rod and transversely to the central axis or line of flight, of the vehicle as previously defined (i.e. the central axis extending in the direction of flight). In this embodiment the suspension points on the end portions of the control rod move laterally inwardly and outwardly with respect to the vehicle body thereby adjusting the load lines for steering the aircraft.

As a further embodiment the aircraft of this invention can be adapted for operation by a person sitting on a pilot seat suitably mounted on the vehicle and controlling the steering by a steering or foot bar located forward of the seat on the vehicle and pivotable about a vertical axis having outer ends connecting to control lines running over pulleys mounted on the vehicle and connected to the control bar. In this embodiment, the radio control system including the transmitter, receiver, battery assembly, electric motor and transmission or pulley drive means would not be necessary and the propulsion could be an internal combustion engine, such as described in my previous U.S. Pat. No. 4,934,630, controlled in a conventional manner by a throttle system operated by the pilot.

BRIEF DESCRIPTION OF THE DRAWINGS

The invention will now be described in greater detail with reference to the accompanying drawings, wherein:

FIG. 1 is a perspective view of the invention in a flight condition;

FIG. 2 is a vertical cross-sectional view through the central vertical plane of the vehicle shown in FIG. 1;

FIG. 3 is a cross-sectional view taken along line 3—3 of FIG. 2;

FIG. 4 is a bottom plan view of the vehicle shown in FIG. 1;

FIG. 5 is a schematic perspective view of an alternative embodiment of the invention using a pulley and flexible cable type steering system;

FIG. 6 is a schematic perspective view of a further embodiment of the invention using a transversely movable control rod operated by a pulley and flexible cable steering system; and FIG. 7 is a view similar to FIG. 5 showing a further embodiment wherein the control rod is mounted on a vertical axis.

DETAILED DESCRIPTION

Referring now to the drawings, FIG. 1 shows an aircraft constructed in accordance with one embodiment of the present invention having a vehicle body 1, a flexible wing 2, a group or groups of spaced load suspension lines 3 interconnecting the vehicle 1 with the leading edge portion 4 of the wing 2 and load lines 5 connecting the vehicle to the trailing edge portion 10. Load lines 6 may also be used connecting the vehicle, such as to the chute bottom surface 8, at locations intermediate the leading edge portion 4 and trailing edge portion 10. The lower ends of the control or suspension load lines are connected to suspension points 12, 14 on opposite end portions of control rod 16 movably mounted on vehicle 1.

The flexible or semi-flexible wing portion 2 of the aircraft may be a ram air inflated type of airfoil canopy made of flexible fabric such as nylon. The canopy includes a top surface skin 20 extending in a chordwise direction along an airfoil curvature from the leading edge portion 4 to the trailing edge portion 10 when in an inflated condition. The canopy has sides 18 and is inflated by the in-flow of air into a plurality of air cells 22 that extend chordwise and are separated by ribs 24. The foregoing type of ram air inflated canopy is generally well known in the art except for the particular locations at which the suspension load lines are connected thereto in chordwise spaced relationship in order to establish the required geometrical relationship with the flight vehicle 1 as will be explained in detail hereinafter. The canopy at the leading edge portion 4 has an air intake face 26 in which lie the open ends of the canopy inflating cells 22. The air intake face 26 also forms part of the geometrical relationship to enhance canopy inflation during the take-off phase of operation as will also be explained hereinafter in more detail.

The wing portion can also be a substantially rigid foamed plastic material, or some other suitable material, that is not ram air inflated but formed to have a shape similar to that shown in FIG. 1.

The vehicle body in the first embodiment of the invention is a unitary vehicle preferably made of molded plastic material, or fiberglass, and having a substantially streamlined body 1 with a lower section 28 having forward and rear portions. An upstanding column type portion 30 extends from the rear portion and has at its upper end a cowling or nacelle 32 having an open forward end 34 and a hollow interior in which the motor 36 is mounted for driving propeller 38. Extending upwardly from the cowling or nacelle 32 is a further column portion 40 primarily for supporting propeller guard ring 42 at an upper portion 44 thereof, the lower portion of guard ring 42 being supported at the rear end portion 46 of body 19 28. Guard ring 42 may also be of a plastic material, or any other material, such as a light weight metal of sufficient strength to function as a guard ring for the propeller, and is connected to portions 44 and 46 of the body in holes or bores provided therein by a suitable means such as bonding.

Wheels are provided for supporting the vehicle on the ground, and as shown a tri-wheel arrangement includes a forward wheel 50 rotatably mounted in a wheel well or slot 52 on an axle 54 extending through the wheel well and mounted at its ends in axle mounting lugs 56 integral with the forward end of body 28, and rear wheels 58 rotatably mounted on rear axle 60 extending transversely through the rearward end of the body 28, or a rear axle mounting boss 62 integral with the body 28. The wheels may be mounted on their axles by suitable wheel bearings, such as roller bearings, needle bearings, etc., and the axles may be mounted on the body rigidly, such as by bonding, or in any suitable manner which will provide for free rotation of the wheels. Clear plastic windshield 65 is mounted at its rim portion, such as by bonding, for example, to the top of the central part of body 28 and the front of column portion 30.

Electric motor 36 for driving the propeller is mounted by fasteners, such as screws or bolts, on a motor mounting block 64, integral with, or mounted in any suitable manner on one or both column portions 30, 40, or in cowling or nacelle 32, so that it is rigidly held in place with respect to the body 28. Drive motor 36 has drive shaft 66 extending therefrom rearwardly with respect to the body 28 for driving propeller 38 connected thereto in any suitable manner, which would be well known to any one skilled in this art.

In the embodiment shown in FIGS. 1-4, steering control rod 16 is pivotally mounted about a horizontal axis aligned generally with the direction of flight of the aircraft vehicle. Control rod 16 extends transversely with respect to the central longitudinal axis, or longitudinal vertical plane, of the body, and is pivotally mounted on shaft 70 (FIG. 2) directly, such as through a hole in the shaft, or by a suitable bearing, such as a bushing, sleeve, ball bearing, needle bearing, or roller bearing, for example, to allow free pivotal movement of rod 16 on shaft 70. Shaft 70 may extend through a hole in the forward portion of column 40 and extend rearwardly for mounting in the lower part of column portion 40, or in engine mounting block 64 by means of interengaging screw threads on the rearward end of shaft 70 and hole 72 in mounting block 64, or another part of the body. Slots 74 are provided in the walls of column portion 40 to allow pivotal movement of rod 68 therein.

Control rod 16 has outer end portions 76 to which the lower ends of the load suspension lines are connected. These may be in the form of eyes 78 on the ends of rod 16 having rings 80 loosely mounted therein to which the lower ends of the load suspension lines are attached in any suitable manner, such as by tying, for example. Between outer ends 76 and the central portion of rod 16 steering links 82 are pivotally attached at their upper ends by suitable means at 84 and extend downwardly and are pivotally connected to the outer end portions of drive link 86 which is pivotally mounted on horizontal axle member 88 mounted on a rigid support part 90 within the hollow interior of column portion 30. Drive link 86 has a gear segment 92 thereon, or integral therewith, for rotating drive link 86 about its central axis 88 by a suitable transmission means, such as additional gears 94, 96 forming a transmission whose input is provided by an electric steering drive motor 98 having output shaft 100 non-rotatably engaged with gear 96. Steering drive motor 98 is a servo motor controlled and operated by a radio receiver which may be an integral part thereof, or separate therefrom, and is electrically connected thereto so that the radio receiver upon receiving command signals from the ground unit radio transmitter drives motor 98 either clockwise or counterclockwise, as shown in FIG. 3, for pivoting control rod 16 about its central axis 70 to control the manipulation and/or tension, in the load suspension lines to steer the canopy as will be apparent from FIG. 1. Slots 102 are provided in the sides of lower column portion 30 through which the arms of drive link 86 extend for free movement therein.

A battery pack 104 is slidably insertable from the rear end 46 of body 28 in a battery chamber 106 provided therein for easy access, removal and insertion and may be retained therein by frictional engagement with the walls or other parts in the chamber. Cover plate 108 may be provided if desired removably attachable by some suitable means to the rear end of chamber 106 to additionally or alternatively retain the inserted battery pack therein. Battery pack 104, which is preferably rechargeable, has lead wires connected thereto and extending therefrom and removably connectable by connector 110 to additional lead wires extending from receiver 112. As previously stated receiver 112 is part of a dual channel remote control radio transmitter and receiver unit wherein the ground control unit has dual controls thereon, one of which is for controlling the signal which operates steering drive motor 98 and the other of which is for controlling the signal which operates propeller motor 36.

An access opening 114 is provided in the bottom of vehicle 28 to provide access to servo control motor 98 when battery pack 104 is removed and to provide access to the interior of body 28 for connecting lead wires by connector 110, as well as access to receiver 112 mounted within the body 28 as shown in FIG. 2. Removable cover plate 116 may be provided for closing access hole 114.

Servo motor 98 and receiver unit 112, if separate, are mounted within the vehicle in any suitable manner, such as by screws, glue, frictional engagement means, clamping means, etc.

FIG. 5 shows a further embodiment of the steering control system wherein control rod 16 is operated by flexible steering lines 140 engaging idler pulleys 142 mounted on horizontal axes 144 on body 28. One end of each steering line 140 is connected to control rod 16 at 146 and the other end thereof is connected to opposite ends of steering lever 148 rotatably mounted on a vertical axis 150 on body 28 so that rotation of lever 148 operates control rod 16 in the same manner as steering links 82 shown in the first embodiment above. Steering lever 148 in this embodiment can be operated and controlled similarly to drive steering link 86 in the first embodiment by a steering drive motor. However, this steering system can be installed on a vehicle similar to that shown in the above referred to U.S. Pat. No. 4,934,630 so that the pilot sitting in a seat thereon can operate steering lever 148 as a foot control lever, as shown in phantom in FIG. 5. Steering lever 148 can also be a hand operated lever suitably mounted therefor or can be operated by any pilot operated control unit such as a suitable linkage. In this embodiment, of course, the radio controlled remote system is not utilized and the propeller is driven by an internal combustion engine which is controlled by a throttle means operated by the pilot in a manner similar to that shown in the above referred to U.S. Pat. No. 4,934,630.

FIG. 6 shows a further embodiment wherein control rod 16' is horizontally slidably mounted transversely to the line of flight of the vehicle in a bushing or sleeve type mounting 151, for example, rigidly mounted on column portion 30, or 40, or cowling or nacelle 32, so that control rod 16'0 is movable in the direction of its longitudinal axis by steering control lines 152 each connected at one end to control rod 16' at 154 and operating over idler pulleys 156 mounted on column portion 30. or 40, and body 28, the idler pulleys being mounted on horizontal axes. The other end of steering lines 152 are connected to opposite ends of a control steering lever 148 pivotally mounted about a vertical axis 150 in the same manner as shown in the embodiment of FIG. 5. In this embodiment operation of steering lever 148 shifts the ends of control rod 16' inwardly and outwardly with respect to the vehicle to manipulate the lower ends of the load suspension lines connected at 12' and 14' to shift or move the canopy relative to the vehicle body in a manner causing the aircraft to turn.

FIG. 7 shows an alternative embodiment of the invention wherein control rod 16" is pivotally mounted on a vertical axis 118 so that ends 12", 14" to which the suspension load lines are attached are movable in a horizontal plane. In this embodiment, control rod 16' is rotated for steering by steering control lines 120 guided over rotatable uplleys 122 mounted in a suitable manner on the body 28, column 30, or cowling 32. One end of each control line 120 is connected to control rod 16" at 124 and the other ends are connected to steering drive lever 126 at 128, for example. In this schematic illustration it will be apparent that turning the steering lever 126 about its vertical pivot axis 130 will rotate control rod 16" to move the connecting points 12", 14" relatively to the vehicle to manipulate the load suspension lines in a lateral manner relative to the longitudinal vehicle body axis thereby providing control steering of the aircraft.

In the design of all of the embodiments of the instant invention, it is essential that the center of gravity of the vehicle be below the connection points 12, 14 on the suspension and control lever 16.

The manner in which the steering control rod movements manipulate the suspension load lines to steer the canopy will now be briefly described.

In the embodiment of FIG. 1 where control rod 16 pivots about a horizontal axis, in level flight the air pressure under the canopy is higher than the ambient air which of course creates the lift necessary for the flight condition. When control rod 16 is tilted so that the right end at 12 is lowered and the left end at 14 is raised, the force on the lines 3, 5 and 6 tilts the wing canopy 2 so that the right side thereof is lowered and the left side is raised whereby the higher pressure air on the underside spills out the higher or left side. The resultant reaction force on the canopy is opposite to the mass flow of the air spilled out and provides a force shifting the canopy to the opposite side which produces a turn.

In the embodiment of FIG. 6 wherein the control rod 16' is movable laterally rather than tilted, with the center of gravity during straight flight being under the control rod, the ends at 12', 14' are substantially equidistant from the center line or central longitudinal plane of the vehicle in the direction of flight. Movement of right end at 12' laterally outwardly and corresponding movement of the left end at 14' laterally inwardly draws the left side of the canopy downwardly and raises the right side of the canopy upwardly producing more lfit on the right side of the wing creating a rolling moment about the center of gravity which banks the aircraft to the opposite side where there is less lift since there is less area relative to the vertical plane passing through the center of gravity. Thereby, the aircraft is turned.

In the embodiment of FIG. 7 where the control rod 16" is mounted for rotation about a vertical axis 118, operation of the control rod to rotate the right end at 12" forwardly and the left end at 14" rearwardly relative to the front of the vehicle causes the wing canopy 2 to turn to follow the control rod to maintain alignment therewith. The vehicle then realigns itself with the canopy thereby affecting a turn.

I claim:

1. An aircraft comprising:
   an airfoil canopy for producing lift by aerodynamic forces exerted thereon;
   a plurality of flexible load lines connected to said canopy;
   a vehicle suspended from said canopy by said load lines in a flight supporting position, said vehicle having a center of gravity and a directional axis extending substantially in the direction of flight of said vehicle in said flight supporting position;
   steering control bar means movabley mounted on said vehicle and extending in a direction substantially transverse to said directional axis;
   at least two suspension points on said control bar means connected to said load liens so that said center of gravity of said vehicle is below said suspension points in said flight supporting position; and
   control means for moving said steering control bar means relative to said vehicle for manipulating said load lines to control the attitude of said canopy in said flight supporting position and steer the aircraft.

2. An aircraft as claimed in claim 1 wherein said steering control bar means comprises:
   an elongated control bar having end portions; and
   pivot means for pivotally mounting said control bar on said vehicle between said end portions.

3. An aircraft as claimed in claim 2 wherein:
   said control bar is mounted by said pivot means for pivotal movement about an axis which is substantially horizontal in level flight.

4. An aircraft as claimed in claim 2 wherein:
   said control bar is mounted by said pivot means for pivotal movement about an axis which is substantially vertical in level flight.

5. An aircraft as claimed in claim 1 wherein
   an elongated control bar having a longitudinal axis and end portions; and
   means for mounting said control bar for movement in the longitudinal direction thereof substantially transversely relative to said directional axis of said vehicle.

6. An aircraft as claimed in claim 1 and further comprising:
   power means mounted on said vehicle for providing forward thrust to said aircraft.

7. An aircraft as claimed in claim 3 wherein:
   said directional axis of said vehicle comprises a directional front to rear axis;
   a mounting hole extending transversely through said control rod; and
   said pivot means comprises a pivot shaft extending through said mounting hole and having a pivot axis and mounted on said vehicle with said pivot axis substantially parallel with said directional axis.

8. An aircraft as claimed in claim 3 wherein:
   said directional axis of said vehicle comprises a directional front to rear axis;

a mounting hole extends transversely through said control rod; and said pivot means comprises a pivot shaft extending through said mounting hole and having a pivot axis and mounted on said vehicle with said pivot axis extending substantially perpendicular to said directional axis.

9. An aircraft as claimed in claim 7 and further comprising:

a plurality of ground support wheels rotatably mounted on said vehicle for supporting said vehicle for movement on the ground.

10. An aircraft as claimed in claim 1 wherein:

said airfoil canopy comprises a substantially flexible canopy.

11. An aircraft as claimed in claim 10 wherein:

said canopy comprises a ram air inflatable canopy.

12. An aircraft as claimed in claim 1 wherein said control means comprises:

linkage means mounted on said vehicle and operatively connected to said steering control bar means;

servo motor means mounted on said vehicle and connected to said linkage means for moving said steering control bar; and means for operating said servo motor means.

13. An aircraft as claimed in claim 1 wherein said control means comprises:

cable and pulley means mounted on said vehicle and operatively connected to said steering control bar for moving said steering control bar; and means for operating said cable and pulley means.

14. An aircraft as claimed in claim 12 wherein said means for operating said servo motor means comprises:

electric storage battery means supported on said vehicle and electrically connected to said servo motor;

radio signal receiver means mounted on said vehicle and electrically connected to said battery means and said servo motor for controlling the operation of said servo motor; and remote control radio transmitter means for transmitting control signals to said receiver means for controlling said servo motor.

15. An aircraft as claimed in claim 14 wherein:

electric motor power means is mounted on said vehicle;

propeller means is mounted on said electric motor power means to be driven thereby to provide thrust for the aircraft;

said battery means is electrically connected to said motor power means; and said receiver means and radio transmitter means further comprise means for controlling the speed of said motor power means.

16. An aircraft as claimed in claim 2 and further comprising:

power means mounted on said vehicle for providing forward thrust to said aircraft.

17. An aircraft as claimed in claim 3 and further comprising:

power means mounted on said vehicle for providing forward thrust to said aircraft.

18. An aircraft as claimed in claim 4 and further comprising:

power means mounted on said vehicle for providing forward thrust to said aircraft.

19. An aircraft as claimed in claim 5 and further comprising:

power means mounted on said vehicle for providing forward thrust to said aircraft.

20. An aircraft as claimed in claim 1 wherein:

said control means comprises a pilot operated control mechanism.

21. An aircraft comprising:

an airfoil canopy for producing lift by aerodynamic forces exerted thereon;

a plurality of flexible load lines connected to said canopy;

a vehicle suspended from said canopy by said load lines in a flight supporting position said vehicle having a center of gravity and a directional axis extending in the direction substantially of flight of said vehicle in said flight supporting position;

steering control bar means movably mounted on said vehicle and extending in a direction substantially transverse to said directional axis;

at least two suspension points on said control bar means connected to said load lines so that said center of gravity of said vehicle is below said suspension points in said flight supporting position;

control means for moving said steering control bar means relative to said vehicle for manipulating said load lines to control the attitude of said canopy in said flight supporting position and steer the aircraft;

electric motor means mounted on said vehicle;

propeller means mounted on said vehicle and connected to said motor means for being driven thereby to provide thrust for the aircraft; and battery means supported on the vehicle below said control bar means and operatively connected to said motor means for operating said motor means.

* * * * *